US012780129B2

(12) United States Patent

Salter et al.

(10) Patent No.: US 12,780,129 B2

(45) Date of Patent: Nov. 3, 2026

(54) VEHICLE HAVING TAILGATE AUDIO MODE AND METHOD

(71) Applicant: Ford Global Technologies, LLC, Dearborn, MI (US)

(72) Inventors: Stuart C. Salter, White Lake, MI (US); Jessica Louise Smith, Brighton, MI (US); David Celinske, Wolverine Lake, MI (US); Brendan F. Diamond, Naples, FL (US); Rudi Todd Ansbacher, Westland, MI (US); Ronak Parikh, Grosse Pointe Farms, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 39 days.

(21) Appl. No.: 18/934,336

(22) Filed: Nov. 1, 2024

(65) Prior Publication Data

US 2026/0125009 A1 May 7, 2026

(51) Int. Cl.

*B60R 16/033* (2006.01)
*B60R 16/03* (2006.01)

(Continued)

(52) U.S. Cl.

CPC ............ *B60R 16/033* (2013.01); *B60R 16/03* (2013.01); *B60W 10/18* (2013.01); *B60W 10/26* (2013.01); *B60W 10/30* (2013.01)

(58) Field of Classification Search

CPC ... B60R 11/0217; B60R 16/03; B60R 16/033; B60W 10/18; B60W 10/26; B60W 10/30; H02J 7/0048; H02J 9/002

See application file for complete search history.

(56) References Cited

U.S. PATENT DOCUMENTS 4,551,812 A * 11/1985 Gurr ...................... H02J 3/003 307/35
6,249,106 B1 * 6/2001 Turner ................. H02J 7/0032 320/136

(Continued)

FOREIGN PATENT DOCUMENTS

CN 117897877 A 4/2024
GB 2609975 A 2/2023

(Continued)

*Primary Examiner* — John M Zaleskas

(74) *Attorney, Agent, or Firm* — Frank Lollo; Price Heneveld LLP

(57) ABSTRACT

A vehicle has a body, a plurality of audio devices supported on or within the body, a motor and a plurality of electronic modules including an audio control module, a display control module, a lock control module, a brake control module and a modem control module. One or more batteries power the plurality of audio devices and the plurality of electronic modules. A controller is configured to control electrical power supplied to the plurality of electronic modules and configured to operate in a tailgate audio mode to control electric power supplied by the one or more batteries to the electronic modules in the tailgate audio mode. The controller determines available battery energy and expected energy and derates the power supplied to one or more of the plurality of electronic modules based on power supply of the one or more batteries in the tailgate audio mode.

19 Claims, 3 Drawing Sheets

(51) Int. Cl.
*B60W 10/18* (2012.01)
*B60W 10/26* (2006.01)
*B60W 10/30* (2006.01)

(56) References Cited

U.S. PATENT DOCUMENTS

| | | | | |
|---|---|---|---|---|
| 8,269,641 | B2 | 9/2012 | Bauman et al. | |
| 9,643,512 | B2 | 5/2017 | Soo et al. | |
| 11,780,438 | B1 * | 10/2023 | Eifert | B60W 20/11 701/112 |
| 2004/0232881 | A1 * | 11/2004 | Amano | H02J 9/002 320/104 |
| 2005/0100174 | A1 * | 5/2005 | Howard | H04R 5/04 381/86 |
| 2008/0175405 | A1 * | 7/2008 | Couvillon | H04R 5/02 381/86 |
| 2008/0224663 | A1 * | 9/2008 | Mack | B60W 20/15 320/132 |
| 2010/0102630 | A1 * | 4/2010 | Turski | H02J 7/0032 307/10.7 |
| 2011/0298624 | A1 * | 12/2011 | Bauman | H02J 7/14 320/109 |
| 2016/0082975 | A1 * | 3/2016 | Lovett | B60W 10/30 701/2 |
| 2016/0159220 | A1 * | 6/2016 | Enomoto | B60L 1/006 701/22 |
| 2017/0279296 | A1 * | 9/2017 | Kwon | B60R 16/03 |
| 2018/0029589 | A1 * | 2/2018 | Dextreit | F02D 41/065 |
| 2018/0222384 | A1 * | 8/2018 | Dudar | B60W 10/06 |
| 2018/0265088 | A1 * | 9/2018 | Cikalo | B60W 30/18054 |
| 2018/0326993 | A1 * | 11/2018 | Lovett | H04L 67/125 |
| 2019/0347402 | A1 * | 11/2019 | Hamada | B60R 16/0231 |
| 2021/0053460 | A1 * | 2/2021 | Oh | B60L 1/006 |
| 2021/0387528 | A1 * | 12/2021 | Thompson | B60L 1/00 |
| 2021/0403010 | A1 * | 12/2021 | Symanow | B60W 50/0225 |
| 2022/0024332 | A1 * | 1/2022 | Powell | B60L 58/20 |
| 2022/0203859 | A1 * | 6/2022 | Kim | B60L 53/665 |
| 2022/0332196 | A1 * | 10/2022 | Christen | B60L 50/11 |
| 2022/0396257 | A1 * | 12/2022 | Edman | H04W 4/44 |
| 2023/0009818 | A1 * | 1/2023 | Park | B60L 3/0046 |
| 2023/0311607 | A1 * | 10/2023 | Rocroi | B60W 50/0097 701/37 |
| 2023/0311608 | A1 * | 10/2023 | Rocroi | B60W 40/105 701/37 |
| 2023/0311609 | A1 * | 10/2023 | Bensaid | B60G 17/017 701/37 |
| 2024/0174108 | A1 | 5/2024 | Jing et al. | |
| 2024/0239303 | A1 * | 7/2024 | Salter | B60R 25/305 |
| 2024/0383420 | A1 * | 11/2024 | Gunner | B60W 50/14 |
| 2024/0388122 | A1 * | 11/2024 | Fredrickson | H02J 7/855 |
| 2024/0391395 | A1 * | 11/2024 | Clarke | G10K 15/02 |
| 2025/0121784 | A1 * | 4/2025 | Salter | B60R 16/03 |
| 2025/0260226 | A1 * | 8/2025 | Salter | H02J 9/005 |
| 2026/0145626 | A1 * | 5/2026 | Weston | B60R 16/033 |

FOREIGN PATENT DOCUMENTS

| | | | | | |
|---|---|---|---|---|---|
| GB | 2619845 | A | * | 12/2023 | B60R 11/0217 |
| WO | WO-2023021127 | A1 | * | 2/2023 | H04S 7/30 |
| WO | WO-2023021161 | A1 | * | 2/2023 | B60W 50/14 |
| WO | WO-2024175423 | A1 | * | 8/2024 | H04S 7/30 |

* cited by examiner

VEHICLE HAVING TAILGATE AUDIO MODE AND METHOD

FIELD OF THE DISCLOSURE

The present disclosure generally relates to motor vehicles that may operate in a tailgate audio mode, and more particularly relates to a vehicle and method of efficiently controlling the motor vehicle electric powered modules to provide for extended tailgate audio mode operation with audio devices.

BACKGROUND OF THE DISCLOSURE

Motor vehicles are commonly equipped with a plurality of audio speakers and exciters for providing sound for entertainment and feedback. Some motor vehicles may be utilized for tailgating in a tailgate audio mode in which the motor vehicle is stopped in Park and audio speakers and exciters may be operated to provide sound entertainment. It may be desirable to provide for a vehicle configured with a tailgate audio mode that offers efficient battery energy utilization.

SUMMARY OF THE DISCLOSURE

According to a first aspect of the present disclosure, a vehicle has a body, a plurality of audio devices supported on or within the body, a motor and a plurality of electronic modules including an audio control module, a display control module, a lock control module, a brake control module and a modem control module. The vehicle further has one or more batteries for powering the plurality of audio devices and the plurality of electronic modules. A controller is configured to control electrical power supplied to the plurality of electronic modules and configured to operate in a tailgate audio mode to control electric power supplied by the one or more batteries to the electronic modules in the tailgate audio mode. The controller determines available battery energy and expected energy and derates the power supplied to one or more of the plurality of electronic modules based on power supply of the one or more batteries in the tailgate audio mode.

Embodiments of the first aspect of the present disclosure can include any one or a combination of the following features:

- the controller allows the plurality of audio devices to operate in the tailgate mode;
- the controller initiates charging of the one or more batteries to an elevated charge state upon detection of the tailgate audio mode;
- the motor comprises an internal combustion engine;
- the one or more batteries include an approximately 12-volt battery;
- an input for entering the tailgate mode;
- the controller detects an open door of the vehicle in a stopped vehicle condition and initiates the tailgate audio mode based on the open door in the stopped vehicle condition;
- the controller derates the display control module to turn off one or more screens based on available power from the one or more batteries;
- the controller derates the lock control module to turn off power supplied to operate electronic locks;
- the controller derates the audio control module to turn off one or more internal audio speakers; and
- the controller derates the modem control module to turn off power.

According to a second aspect of the present disclosure, a vehicle has a body, a plurality of audio devices supported on or within the body, a motor and a plurality of electronic modules including an audio control module, a display control module, a lock control module, a brake control module and a modem control module. The vehicle also has one or more batteries for powering the plurality of audio devices and the plurality of electronic modules. A controller is configured to control electrical power supplied to the plurality of electronic modules and is configured to operate in a tailgate audio mode to control electric power supplied by the one or more batteries to the electronic module in the tailgate audio mode. The controller supplies power to the plurality of audio devices and supplies power to only one or more of the audio control module, the display control module, the lock control module, the brake control module and the modem control module of the plurality of electronic modules in the tailgate audio mode.

Embodiments of the second aspect of the present disclosure can include any one or a combination of the following features:

- the controller supplies electrical power to only the audio control module, the display control module, the lock control module, the brake control module and the modem control module of the plurality of electronic modules; and
- the controller determines available battery energy and expected energy consumption and derates the battery power supplied to one or more of the audio control modules, the display control module, the lock module, the brake module and the modem module.

The disclosure further includes a method of controlling electronic modules on a vehicle in a tailgate audio mode. The method comprises the steps of entering a tailgate audio mode on the vehicle, storing electrical energy in one or more batteries, supplying the electrical energy to a plurality of electronic modules including an audio control module, a display control module, a lock control module, a brake control module and a modem control module, powering one or more audio devices in the tailgate audio mode with the electrical energy and derating one or more of the plurality of electronic modules to reduce power consumption based on expected energy consumption and the available power in the one or more batteries.

Embodiments of the third aspect of the present disclosure can include any one or a combination of the following features:

- the step of inputting an input from an operator to enter the tailgate audio mode;
- the step of initiating charging of the one or more batteries to an elevated charge state upon entering the tailgate audio mode;
- the vehicle comprises an internal combustion engine;
- the step of detecting an open door of the vehicle in a stopped condition and initiating the tailgate audio mode based on the open door in the vehicle stopped condition; and
- the controller further derates energy supplied to one or more of the display control module to turn off one or more screens based on available energy from the one or more batteries, the lock control module to turn off the power supplied to operate electronic locks, the audio control module to turn off one or more internal audio speakers and the modem control module to turn off power.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
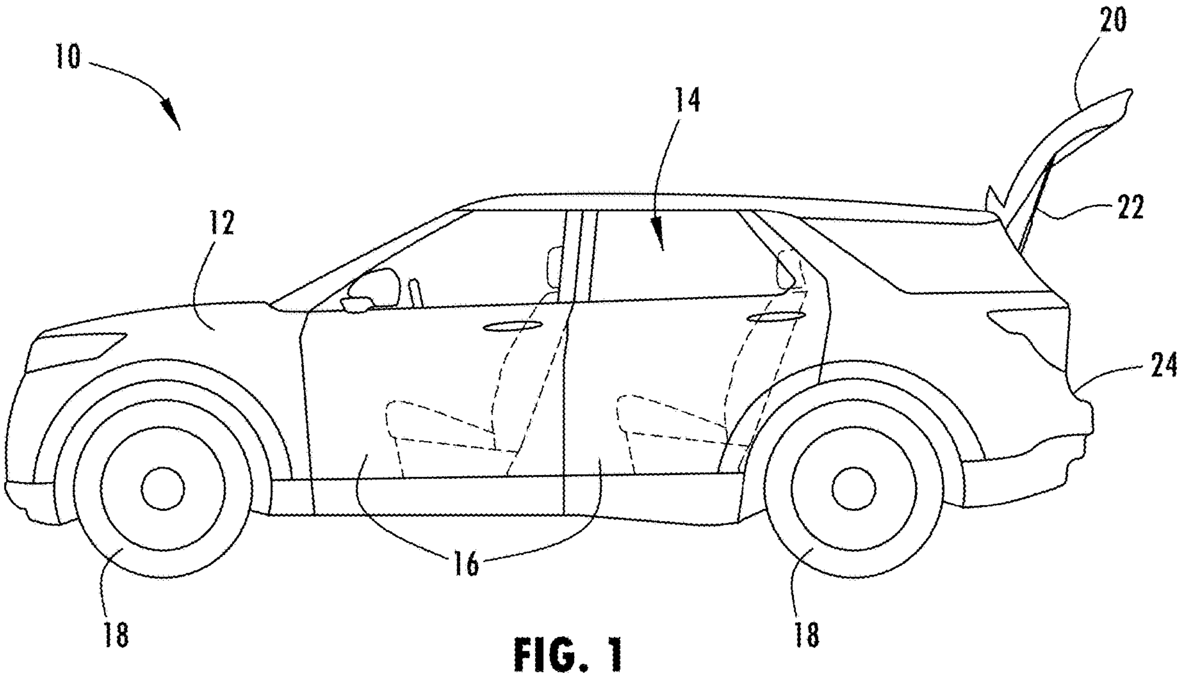
FIG. 1 is a side schematic view of a motor vehicle equipped with a plurality of audio speakers for use in a tailgate mode.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle and method of controlling electronic control modules in a tailgate audio mode. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, a motor vehicle 10, such as a wheeled motor vehicle, is generally illustrated having a vehicle body 12 defining a cabin interior, also referred to as a passenger compartment 14. The vehicle body 12 includes body panels and one or more side passenger doors 16, generally located on opposite lateral sides of the motor vehicle 10. The vehicle body 12 further includes a rear end closure shown in one example as a liftgate 20 that may move between an open position exposing a door opening 24 at the rear end of the passenger compartment 14 as shown in FIG. 1 and a closed position which closes in door opening 24 at the rear end of the vehicle. The liftgate 20 may be actuated between the open and closed positions with an actuator such as a liftgate actuator coupled to an actuator linkage 22 which may be actuated by an electric motor, for example. The actuator linkage 22 may be actuated to move the rear end closure liftgate 20 to pivot about upper hinges between the generally horizontal open position as shown and a generally vertical closed position.

The cabin interior which serves as the passenger compartment 14 typically includes a plurality of passenger seats including a driver's seat and one or more additional passenger seats. In addition, the motor vehicle 10 may include one or more interior mounted audio devices within the passenger compartment, referred to as interior audio speakers, for example. The interior audio speakers may provide audio sound that may be heard both within the passenger compartment 14 and in an exterior environment proximate to the motor vehicle 10 such as when the liftgate 20 and/or one or more side passenger doors 16 are in the open position, particularly when the motor vehicle 10 is operating in a tailgate audio mode.

The motor vehicle 10 is shown as a wheeled motor vehicle having a plurality of tire and wheel assemblies 18. However, it should be appreciated that the motor vehicle 10 may be configured as a sedan, a sport utility vehicle (SUV), a van, a bus, a truck, an all-terrain vehicle (ATV), a utility vehicle (UTV), a cross over or other wheeled motor vehicle. It should further be appreciated that the motor vehicle 10 may be configured as another type of vehicle such as a boat or other vehicles equipped with a motor, electronic modules, one or more batteries and audio devices.

Figure 2:
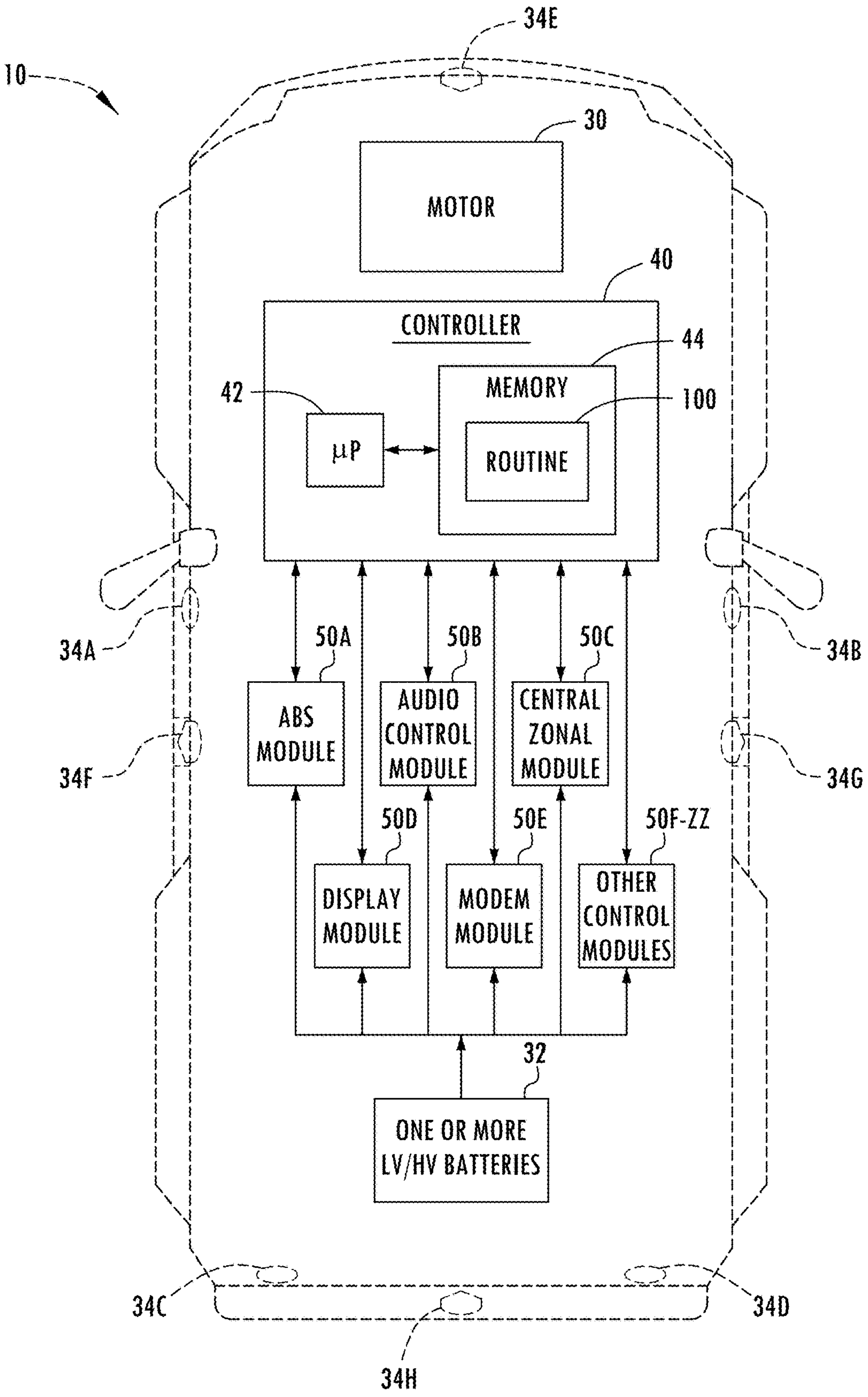
FIG. 2 is a top view of the motor vehicle with a controller and electric powered control modules that may be controlled pursuant to the tailgate audio mode.

Referring to FIG. 2, the motor vehicle 10 is generally illustrated having a motor 30 for powering the tire and wheel assemblies 18 to move the vehicle 10. The motor 30 may include an internal combustion engine (ICE), according to one example. In addition, the motor vehicle 10 has one or more energy storage batteries 32 that are configured to supply electrical power to power electrical devices also referred to as electrical loads on the motor vehicle 10. The one or more batteries 32 may include one or more low voltage batteries, such as one or more approximately 12-volt batteries, that supply electric power to electronic accessories on the motor vehicle 10 including the audio devices and a plurality of electronic control modules. The motor 30 may be operatively coupled to an alternator that in turn may charge the one or more low voltage batteries while the internal combustion engine is operating.

According to another example, the motor vehicle 10 may be configured as a hybrid vehicle which may include an internal combustion engine and one or more electronic motors as the motor 30, and one or more electric motors, and may include one or more high voltage batteries such as approximately 400- or 800-volt batteries that may be used to power the one or more electric motors. It should further be appreciated, according to a further example, that the motor 30 may be one or more electric motors, and that the one or more batteries 32 may include high voltage batteries (e.g., 400V) and one or more low voltage batteries (e.g., 12V), wherein the one or more high voltage batteries power the one or more electric motors and charges the one or more low voltage batteries which are used to power one or more accessory electronic devices including the electronic control modules.

The motor vehicle 10 is equipped with a plurality of audio devices which may be supported on or within the body of the motor vehicle 10. The plurality of audio devices includes audio devices 34A-34H, according to one example. Audio devices 34A and 34B are interior audio speakers shown arranged within the interior side of passenger doors 16 on opposite lateral sides of the motor vehicle 10. Audio devices 34C and 34D are interior audio speakers shown located on the interior side of the liftgate 20. Audio devices 34A-34D are shown configured as audio speakers within the passenger compartment 14, according to one embodiment. Audio device 34E is shown located on the exterior of the front side of the motor vehicle 10. Audio devices 34F and 34G are shown located on the exterior within a support pillar between the passenger doors on each of the left and right sides of the motor vehicle 10 to serve as exterior audio devices. Audio device 34H is shown located on an exterior side of the liftgate 20 at the rear end of the vehicle. The exterior audio devices 34E-34H may be configured as audio exciters, according to one embodiment.

The interior mounted audio devices 34A-34D may be used as audio speakers located within the interior of the vehicle 10 and may provide sound outside of the vehicle 10, particularly when the liftgate 20 of the motor vehicle 10 or one or more doors 16 of the motor vehicle 10 are in the open position such as when operating in the tailgate audio mode. The exterior mounted audio devices 34E-34H are particularly useful for providing exterior sound which may be generated by vibrating a rigid surface such as an outer body panel or a support pillar surface to create sound. Both the interior and exterior audio devices 34A-34H may be used to generate audio sound to the exterior of the motor vehicle 10 when the motor vehicle 10 is operating in a tailgate audio mode.

The one or more batteries 32 have a limited electrical power supply, particularly when the motor 30 has an internal combustion engine that is not operating and recharging the one or more batteries 32. As such, the one or more batteries 32 supplying electrical power to operate the plurality of audio devices 34A-34H will reduce and potentially drain the energy made available by the one or more batteries 32. In order to conserve energy provided by the one or more batteries 32 for use when the motor vehicle 10 is operating in a tailgate audio mode, the motor vehicle 10 employs a power distribution controller 40 that is configured to control a plurality of electronic modules on the vehicle to conserve electrical energy for use in the tailgate audio mode. The power distribution controller 40 generally may include control circuitry such as a microprocessor 42 and memory 44. It should be appreciated that other analog and/or digital control circuitry may be employed for the power distribution controller 40. It should further be appreciated that the power distribution controller 40 controls the distribution of electrical power to various electronic powered modules on the motor vehicle 10 and may be a dedicated controller for power distribution control or may be a shared controller that also performs other functions. The power distribution controller 40 includes one or more routines that includes a power distribution control routine 100 that may be stored in memory 44 and executed by the microprocessor 42 to perform power distribution control while operating in the tailgate audio mode.

The motor vehicle 10 is equipped with a plurality of electronic control modules, all of which require electrical power supplied from the one or more batteries 32 to operate. Accordingly, the electronic control modules consume electrical power when activated and do not consume electrical power when deactivated. The motor vehicle 10 typically has many electronic control modules, and the power distribution controller 40 controls which of the control modules may be operating while in the tailgate audio mode. In the example shown, the motor vehicle 10 has an anti-lock brake (ABS) control module 50A which controls the vehicle braking and which is also needed to start the vehicle when an operator applies a braking input. The motor vehicle 10 also includes an audio control module 50B which controls the audio devices. The motor vehicle 10 further includes a central zonal control module 50C which controls the vehicle door locks. The motor vehicle 10 further includes a display control module 50D which controls one or more vehicle display inputs such as a controls cluster, display screens and radio display, for example. The motor vehicle 10 further includes a modem control module 50F which controls access to remote communication devices such as cell phones, tablets and computers via one or more software apps that may operate on mobile devices used in the vehicle, for example. It should be appreciated that the motor vehicle 10 includes other electronic control modules 50G-50ZZ, wherein ZZ is a significantly higher number and may include 50 or 75, for example, or even more additional electronic control modules onboard the motor vehicle 10.

The motor vehicle 10 may enter the tailgate audio mode when the motor vehicle 10 is stopped and not moving in Park and a request for a tailgate audio mode is input or is detected by detecting an open door when the vehicle is stopped, for example. When the motor vehicle 10 enters the tailgate audio mode, the power distribution controller 40 turns off (i.e., deactivates) all of the other electronic control modules 50G-50ZZ that are considered non-essential in the tailgate audio mode and thereby prevents electrical power from being supplied from the one or more batteries 32 to the other control modules 50F-50ZZ. Initially, the power distribution controller 40 keeps a limited number of electrical control modules active and powered which may include the ABS control module 50A, the audio control module 50B, the central zonal control module 50C, the display control module 50D and the modem control module 50E. The power distribution controller 40 may monitor the energy supply available from the one or more batteries 32 and the anticipated demand for energy that is required to power the plurality of audio devices 34A-34H and the activated electronic control modules 50A-50E, and may further control which of the electronic control modules 50A-50E will remain on and at full power or at partial power. For example, if the power distribution controller 40 determines that electrical power available from the one or more batteries 32 may be depleted within a given time period, the power distribution controller 40 may further derate and thereby reduce or deactivate the power made available to one or more of the electronic control modules 50A-50F, according to the routine 100.

Figure 3:
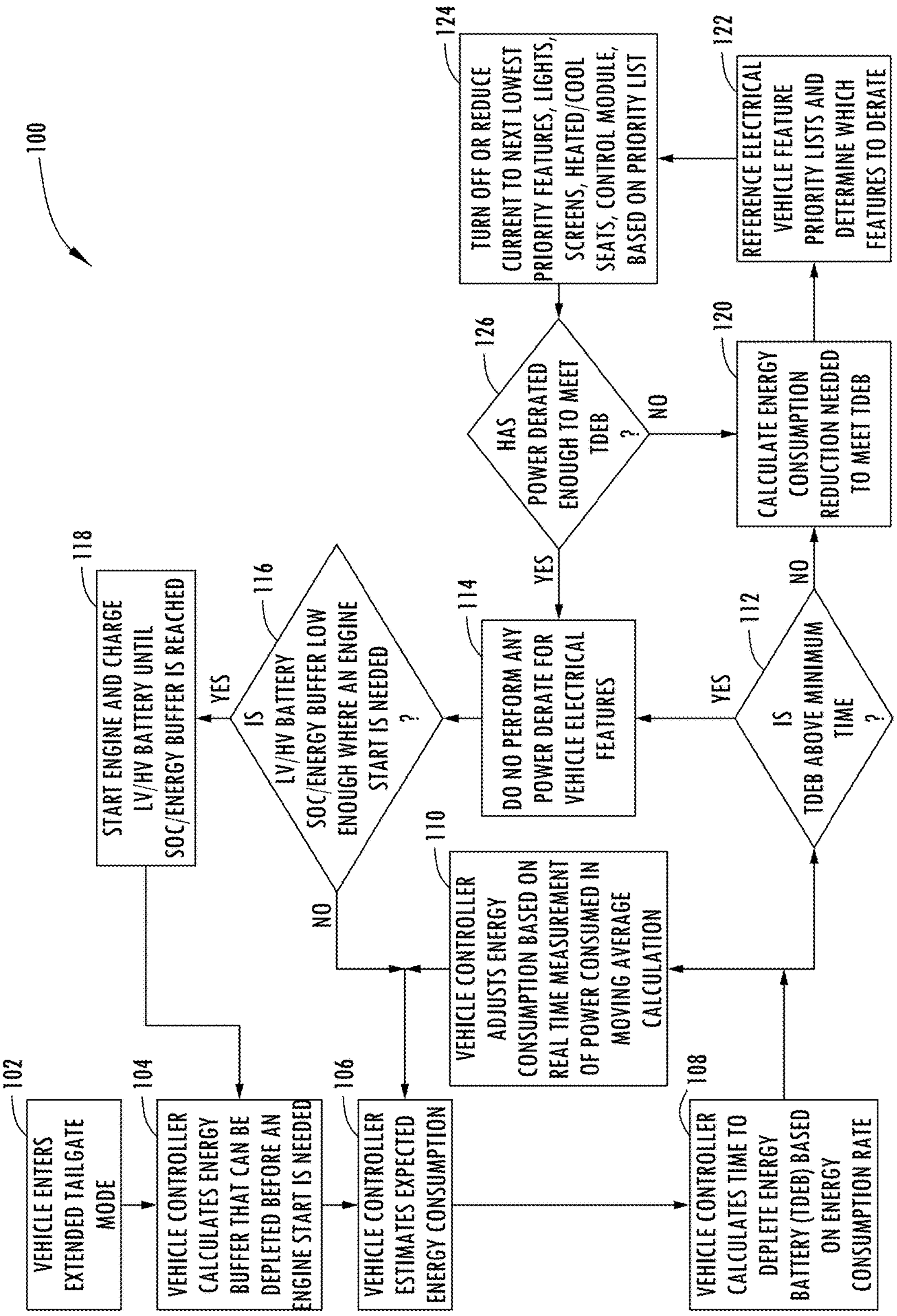
FIG. 3 is a flow diagram illustrating a routine for controlling vehicle control modules to provide efficient energy utilization in the tailgate audio mode.

Referring to FIG. 3, the power distribution control routine 100 is illustrated according to one example. Routine 100 begins at step 102 when the motor vehicle enters the extended tailgate audio mode. This may be achieved by a user entering a tailgate audio mode input request such as a human machine interface (HMI) input on a touchscreen display, a mobile device, a microphone, etc., or by determining that the user would like to enter the tailgate audio mode by determining an inferred action such as the tailgate being open during a vehicle shutdown condition. Once the motor vehicle enters the extended tailgate audio mode, routine 100 proceeds to step 104 where the vehicle power distribution controller calculates a stored energy buffer that can be depleted before an internal combustion engine start is needed to change the one or more batteries. Next, routine 100 proceeds to step 106 where the vehicle power distribution controller estimates the expected energy consumption rate due to the activated electronic control modules and the audio devices operating in the tailgate audio mode.

Routine 100 proceeds to step 108 where the vehicle power distribution controller calculates the amount of time to deplete the energy battery (TDEB) based on the determined energy consumption rate. Routine 100 then adjusts the energy consumption based on the real time measurement of power consumed in a moving average calculation at step 110 before returning to step 106. In addition, routine 100 proceeds to decision step 112 to determine if the time to deplete energy battery (TDEB) is above the minimum time and, if so, proceeds to step 114 so as not to perform any power derating for the vehicle electrical control module features. Thereafter, routine 100 proceeds to decision step 116 to determine if the low voltage/high voltage battery state of charge/energy buffer is low enough where an internal combustion engine start is needed to charge the one or more batteries and, if not, returns to step 106. If the LV/HV battery state of charge/energy buffer is low enough where an engine start is needed, routine 100 proceeds to step 118 to start the internal combustion engine and to thereby charge the one or more batteries until the state of charge/energy buffer is reached and then returns to step 104.

If the time to deplete energy in the battery (TDEB) is not above the minimum time in decision step 112, routine 100 proceeds to step 120 to calculate the energy consumption reduction needed to meet the time to deplete energy in the battery (TDEB). Next, routine 100 proceeds to step 122 to reference the electrical powered vehicle feature priority list and determine which electrically powered features are to be derated. At step 124, routine 100 turns off or reduces electrical supplied current to the next lowest priority electrical powered features on the priority list, including reducing or turning off power supplied to one or more lights, screens, heated/cooled seats and control modules, based on the priority list. The controller may derate one or more of the electronic control modules to conserve battery energy. The controller may derate the display control module to turn off one or more display screens based on available power from the one or more batteries. The controller may derate the lock control module to turn off power supplied to operate electronic locks on the vehicle. The controller may derate the audio control module to turn off one or more internal audio speakers on the vehicle. The controller may derate the modem control module to turn off power to the modem control module and thereby cutoff communication with one or more remote devices.

Thereafter, routine 100 proceeds to decision step 126 to determine if enough electrical power has been derated enough to meet the time to deplete energy in the battery (TDEB) and, if so, returns to step 114. Otherwise, if the power derated is not enough to meet the time to deplete energy in the battery, routine 100 proceeds back to step 120 to recalculate the energy consumption reduction needed to meet the time to deplete energy in the battery and further considers determining which features to derate in step 122 and turns off electrical power to various features in step 124. If the power derated is not enough to meet the time to deplete energy in the battery, the cycle continues through steps 120-126 until the power derated is enough to meet the time to deplete energy in the battery and, if not, eventually ends up at step 118 to start the engine and charge the battery until the state of charge, energy buffer is reached.

Accordingly, the motor vehicle 10 and method 100 of controlling electronic modules on a motor vehicle 10 operating in a tailgate audio mode advantageously provides for electrical power distribution sufficient to ensure adequate electrical power is available to one or more audio devices when operating in a vehicle tailgate audio mode.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle comprising:

a body;

a plurality of audio devices supported on or within the body;

a motor;

a plurality of electronic modules including an audio control module, a display control module, a lock control module, a brake control module and a modem control module;

one or more batteries for powering the plurality of audio devices and the plurality of electronic modules; and a controller configured to control electrical power supplied to the plurality of electronic modules and configured to operate in a tailgate audio mode to control the electrical power supplied by the one or more batteries to the plurality of electronic modules in the tailgate audio mode, wherein the controller determines available battery energy and expected energy consumption and derates the electrical power supplied to one or more of the plurality of electronic modules based on the available battery energy from the one or more batteries and the expected energy consumption in the tailgate audio mode, wherein the controller calculates a time to deplete energy in the one or more batteries based on an expected energy consumption rate and adjusts the derating of the one or more of the plurality of electronic modules according to a priority list.

2. The vehicle of claim 1, wherein the controller allows the plurality of audio devices to operate in the tailgate audio mode.

3. The vehicle of claim 2, wherein the controller initiates charging of the one or more batteries to an elevated charge state upon detection of the tailgate audio mode.

4. The vehicle of claim 1, wherein the motor comprises an internal combustion engine.

5. The vehicle of claim 4, wherein the one or more batteries include an approximately 12-volt battery.

6. The vehicle of claim 1, further comprising an input for entering the tailgate audio mode.

7. The vehicle of claim 1, wherein the controller detects an open door of the vehicle in a stopped vehicle condition and initiates the tailgate audio mode based on the open door in the stopped vehicle condition.

8. The vehicle of claim 1, wherein the controller derates the display control module to turn off one or more screens based on available power from the one or more batteries.

9. The vehicle of claim 8, wherein the controller derates the lock control module to turn off power supplied to operate electronic locks.

10. The vehicle of claim 9, wherein the controller derates the audio control module to turn off one or more internal audio speakers.

11. The vehicle of claim 10, wherein the controller derates the modem control module to turn off power.

12. A vehicle comprising:

a body;

a plurality of audio devices supported on or within the body;

a motor;

a plurality of electronic modules including an audio control module, a display control module, a lock control module, a brake control module and a modem control module;

one or more batteries for powering the plurality of audio devices and the plurality of electronic modules; and a controller configured to control electrical power supplied to the plurality of electronic modules and configured to operate in a tailgate audio mode to control the electrical power supplied by the one or more batteries to the plurality of electronic modules in the tailgate audio mode, wherein the controller supplies the electrical power to the plurality of audio devices and supplies the electrical power to only one or more of the audio control module, the display control module, the lock control module, the brake control module and the modem control module of the plurality of electronic modules in the tailgate audio mode, wherein the controller determines available battery energy and expected energy consumption and derates the electrical power supplied to one or more of the audio control module, the display control module, the lock control module, the brake control module and the modem control module, in the tailgate audio mode, based on the available energy and the expected energy consumption, wherein the controller calculates a time to deplete energy in the one or more batteries based on an expected energy consumption rate and adjusts the derating of the plurality of electronic modules according to a priority list.

13. The vehicle of claim 12, wherein the controller supplies the electrical power to only the audio control module, the display control module, the lock control module, the brake control module and the modem control module of the plurality of electronic modules.

14. A method of controlling a plurality of electronic modules on a vehicle in a tailgate audio mode, the method comprising the steps of:

entering the tailgate audio mode on the vehicle;

storing electrical energy in one or more batteries;

determining available battery energy in the one or more batteries;

supplying the electrical energy to the plurality of electronic modules including an audio control module, a display control module, a lock control module, a brake control module and a modem control module;

determining expected energy consumption for the electronic modules;

powering one or more audio devices in the tailgate audio mode with the electrical energy; and derating one or more of the plurality of electronic modules to reduce power consumption in the tailgate audio mode based on the expected energy consumption and the available battery energy from the one or more batteries, wherein the derating comprises calculating a time to deplete energy in the one or more batteries based on an expected energy consumption rate and adjusting the derating of one or more of the plurality of electronic modules according to a priority list.

15. The method of claim 14, further comprising the step of inputting an input from an operator to enter the tailgate audio mode.

16. The method of claim 14, further comprising the step of initiating charging of the one or more batteries to an elevated charge state upon entering the tailgate audio mode.

17. The method of claim 14, wherein the vehicle comprises an internal combustion engine.

18. The method of claim 14, further comprising the step of detecting an open door of the vehicle in a vehicle stopped condition and initiating the tailgate audio mode based on the open door in the vehicle stopped condition.

19. The method of claim 14, further comprising derating energy supplied to one or more of the display control module to turn off one or more screens based on available energy from the one or more batteries, the lock control module to turn off the power supplied to operate electronic locks, the audio control module to turn off one or more internal audio speakers and the modem control module to turn off power.

* * * * *